United States Patent [19]

Matsumoto et al.

[11] Patent Number: 4,666,307

[45] Date of Patent: May 19, 1987

[54] METHOD FOR CALIBRATING PHOTOGRAPHIC IMAGE INFORMATION

[75] Inventors: Fumio Matsumoto, Tokyo; Kenji Nakauchi; Hideaki Iijima, both of Kaisei, all of Japan

[73] Assignee: Fuji Photo Film Co., Ltd., Minami-Ashigara, Japan

[21] Appl. No.: 691,096

[22] Filed: Jan. 14, 1985

[30] Foreign Application Priority Data

Jan. 19, 1984 [JP] Japan .................................. 59-7535

[51] Int. Cl.⁴ ............................................. G01J 3/40
[52] U.S. Cl. ..................................... 356/404; 355/38; 356/443; 364/525
[58] Field of Search .................. 355/14 E, 35, 38, 68; 356/379, 380, 404, 443, 444; 364/525

[56] References Cited

U.S. PATENT DOCUMENTS

| | | | |
|---|---|---|---|
| 3,709,613 | 1/1973 | Zahn et al. ........................ | 356/443 |
| 3,734,621 | 5/1973 | Woody et al. ..................... | 356/325 |
| 3,874,799 | 4/1975 | Isaacs et al. ...................... | 356/408 |
| 4,176,964 | 12/1979 | Knor et al. ........................ | 356/444 |
| 4,187,435 | 2/1980 | Palmatier et al. ................. | 356/444 |
| 4,222,661 | 9/1980 | Wahli et al. ....................... | 355/68 |
| 4,229,108 | 10/1980 | Childers ............................ | 356/443 |
| 4,263,512 | 4/1981 | Sagusa et al. ..................... | 356/320 |

FOREIGN PATENT DOCUMENTS

| | | | |
|---|---|---|---|
| 0131985 | 10/1979 | Japan ................................. | 356/320 |
| 2070765 | 9/1981 | United Kingdom .............. | 356/320 |

Primary Examiner—F. L. Evans
Attorney, Agent, or Firm—Wenderoth, Lind & Ponack

[57] ABSTRACT

In a photographic image information detecting method of the type in which light transmitted from an original film is received by a two-dimensional image sensor and image information is detected with respect to the divided a plurality of picture elements of the original film, a photographic image information is calibrated by the steps of detecting information of the photographic image of a reference film with respect to the original film in use of the two-dimensional image sensor, storing the thus detected information as data for calibration, and subtracting the data for calibration from the detected data regarding the image information of the original film so as to thereby obtain accurately calibrated information regarding the photographic image of the original film.

2 Claims, 8 Drawing Figures

FILM NEGATIVE

PICTURE ELEMENTS

MEMORY

FIG. 6A

MEMORY 25

| 0 | 0 | 0 | 1 | 0 | 0 |
|---|---|---|---|---|---|
| 0 | 0 | 1 | 0 | 1 | 1 |
| 0 | 0 | 2 | 0 | 1 | 0 |
| 0 | 0 | 0 | 1 | 1 | 0 |
| 0 | 1 | 0 | 2 | 0 | 0 |
| 1 | 1 | 0 | 1 | 0 | 0 |
| 0 | 0 | 0 | 0 | 0 | 1 |

MEMORY 25

| 16 | 59 | 58 | 54 | 43 | 31 |
|----|----|----|----|----|----|
| 12 | 57 | 55 | 55 | 57 | 12 |
| 17 | 55 | 53 | 51 | 55 | 16 |
| 15 | 52 | 52 | 46 | 52 | 20 |
| 14 | 48 | 48 | 44 | 49 | 23 |
| 11 | 46 | 46 | 44 | 49 | 27 |
| 5  | 17 | 17 | 0  | 45 | 29 |

METHOD FOR CALIBRATING PHOTOGRAPHIC IMAGE INFORMATION

BACKGROUND OF THE INVENTION

This invention relates to a method for calibrating a photographic image information of an original film such as a film negative used in a photographic printer in a case where the information of the image which is divided into picture elements is detected throughout the image.

With a photographic printer, it is generally necessary to measure a density amount of an original film such as a film negative for detecting the printing exposure amount or correction amount, and in the prior art technique of this field, a large area transmittance density (LATD) of the film negative is measured by photosensors, such as photodiodes, disposed near a light path of a printing lens unit. However, in the image detecting method by means of this LATD, the average density of the image of the film negative is measured and detected by the photosensors and the image density is not accurately detected entirely throughout the image surface, so that the printing exposure or correction cannot be correctly achieved. In the prior art technique, there has also been proposed a method in which the image surface of the film negative is divided into a plurality of equally aligned picture elements, the light passing through such elements are measured, and the densities detected in accordance with the measured light are corrected after the printing exposure amount has been determined. However, with this method, since the light measurement of the film negative is only approximately carried out, it is difficult to accurately detect information regarding the detail of the image of the film negative.

An apparatus for detecting the photographic image information developed for eliminating problems described above has been proposed by the same applicant, the detail of which disclosed hereunder with reference to FIGS. 1 through 4.

FIG. 1 shows one example of a photographic printer including the proposed detecting apparatus, in which a film negative 2 mounted on a film negative carrier 1 and conveyed to a printing portion is irradiated by a light source 4 through a filter means 3 consisting of three primary color filters of yellow (Y), magenta (M) and cyan (C). A light passing the film negative 2 is projected onto a photographic paper 7 through a lens unit 5 and a black shutter 6. The photographic paper 7 is wound around a supply reel 7A and wound up around a take-up reel 7B which is operated in synchronism with the conveyance and stoppage of the film negative 2 on the film negative carrier 1. Photosensors such as photodiodes 8 for detecting information regarding image densities of the three primary colors of red (R), green (G) and blue (B) are located near the lens unit 5 between the lens unit 5 and the film negative carrier 1 and a printing operation is carried out by signals detected by the photosensors 8. An image information detecting apparatus 10 is arranged near the film negative 2 in an inclined manner with respect to the light axis LS between the light source 4 and the film negative 2 on the film negative carrier 1. A lens unit 12 is located in front of a two-dimensional image sensor 11 for focusing the image of the central portion of the film negative 2. The two-dimensional image sensor 12 and the lens unit 11 are assembled in one unit as an image information detecting apparatus 10 on the rear surface of which is mounted a circuit board 13 to which a processing circuit such as an integrated circuit for processing the image is attached.

The two-dimensional image sensor 11 generally comprises a charge transfer device such as charge coupled device (CCD), and, as shown in FIG. 2, consists of an image detecting section 101 for optically pickup an image, a storage section 102 for storing electric charges transferred from the image pickup section 101 and an output register 103 for outputting the electric charges stored in the storage section 102. According to this construction, the two-dimensional image sensor 11 operates so that drive signals 101S to 103S from a driving circuit 20 control the sensor 11 so as to photoelectrically convert the image information of the two-dimensional area and to generate a picture signal PS which is output in a serial analog form from the output register 103. The circuit means mounted on the circuit board 13 is composed of, for example, the circuit as shown in FIG. 3, in which the image sensor 11 is operatively connected to the driving circuit 20 and is operated by the drive signals 101S to 103S from the driving circuit 20. The light irradiating upon the image pickup section 101 of the image sensor 11 is outputted from the output register 103 as a picture signal PS, which is then sampled by a sample-and-hold circuit 21 and held therein, and the sampled signal is then converted into digital signals DS by an analog-to-digital (A/D) converter 22. The digital signals DS from the A/D converter 22 is inputted into a logarithmic conversion circuit 23 to logarithmically convert the digital signals into signals DN representing the density of the image of the film negative 2 and the density signals DN are then written into a memory 25 through a write-in control circuit 24. In the control circuit 24, a signal RS representing the read-out speed for reading out at a constant speed the image information obtained by the image sensor 11 operated by the driving circuit 20 is preliminarily inputted and the density signals DN are written-in at the predetermined addresses in order of the memory 25 in response to the driving speed of the image sensor 11.

In the case of the usual photograph printing operation, according to the construction of the circuit means shown in FIG. 3, the light transmitted through the film negative 2 mounted on the film negative carrier 1 is detected by the photosensors 8 and then exposed on the photographic paper 7 with the exposure amount to be determined by the opening degree of the black shutter 6 based on the arrangement of the filter means 3 in response to the picture signals of the three primary colors R, G and B, respectively. The image information detecting apparatus 10 is arranged near the film negative 2 mounted on the film negative carrier 1 so as to detect the image information regarding a plurality of equally divided and aligned picture elements of the image throughout the whole film negative surface. In other words, since the two-dimensional image sensor 11 receives the light transmitted through the film negative 2 on the film negative carrier 1 through the lens unit 12 in accordance with the predetermined drive signals 101S to 103S from the driving circuit 20, the two-dimensional image sensor 11 divides the image of the film negative 2 into a plurality of aligned picture elements 21 as shown in FIG. 4A and sequentially scans the whole image of the film negative 2 in accordance with scanning lines SL. After the completion of the scanning operation, the picture signal PS is subsequently transmitted from the output register 103 of the image sensor 11 and sampled and held by the sample-and-hold circuit 21. The sampled signal is then converted into the digital signals DS by the A/D converter 22. The digital signals DS from the A/D converter 22 are logarithmically converted into the density signals DN in the logarithmic conversion circuit 23, which are then controlled by the write-in control circuit 24 and stored in the memory 25 in the aligned order corresponding to the picture elements 21 as digital signals regarding the density of the film negative 2 as shown in FIG. 4B. During the operation described above, it becomes possible to always correspond the divided element positions of the image of the film negative 2 to the data arrangement to be stored in the memory 25 by controlling the timing for writing the read-out speed signals RS received from the driving circuit 20 into the memory 25.

As described hereinabove, the digital values corresponding to the divided picture elements 21 of the picture image of the film negative 2 can be optionally read out from the memory 25 by storing therein the digital values of the picture elements of the film negative 2 or the density values of the picture elements of the three primary colors. Accordingly, if the density values of the three primary colors R, G and B are preliminarily stored as shown in FIG. 4B, the stored values can be read out and processed for example by operating or calculating the values, whereby the processed data can be utilized for determining the exposure amount or correction amount for the photograph printing operation as performed by the prior art method. In addition, since the two-dimensional image sensor 11 can detect the image information of the divided picture elements of the whole image of the film negative 2, the image information can be entirely accurately detected. Since the image sensor 11 is composed of predetermined numbers of picture elements, the image can be physically divided in accordance with the numbers of the picture elements, the element numbers of the image to be divided can be changed in accordance with the read-out speed change in a case where the film negative 2 and the image sensor 11 are moved relative to each other.

However, since the image information (FIG. 4B) stored in the memory 25 is effected by the unevenness of the constructional elements of the image sensor 11, the shading of the light source 4 and the aberration of the lens unit 12, the information of the image of the film negative 2 will not be correctly exhibited. For this reason, when the information stored in the memory 25 is utilized as is, the information is directly subjected to such adverse effects as described above and a photographic image with a good image quality cannot be obtained.

SUMMARY OF THE INVENTION

An object of this invention is to eliminate problems encountered in the prior art technique described above and to provide a method for calibrating photographic image information by preliminarily preparing data for calibration of the image information.

According to this invention, this and other objects are accomplished by the method for calibrating information regarding a photographic image in an image information detecting method of the type in which a light transmitted from an original film is received by a two-dimensional image sensor and image information is detected with respect to the photographic image which is to be divided into a plurality of picture elements of the original film, and the image information calibrating method comprises the steps of detecting information of the photographic picture elements of a reference film with respect to the original film using the two-dimensional image sensor, storing the thus detected information as data for calibration, and subtracting the data for calibration from the detected data regarding the image information of the original film.

The nature, principle and utility of the invention will become more apparent from the following detailed description when read in cojunction with the accompanying drawings.

BRIEF DESCRIPTION OF THE DRAWINGS

In the accompanying drawings:

FIGS. 6A and 6B are data for calibration of the image information and calibrated data thereof, respectively.

DESCRIPTION OF THE PREFERRED EMBODIMENTS

Figure 1:
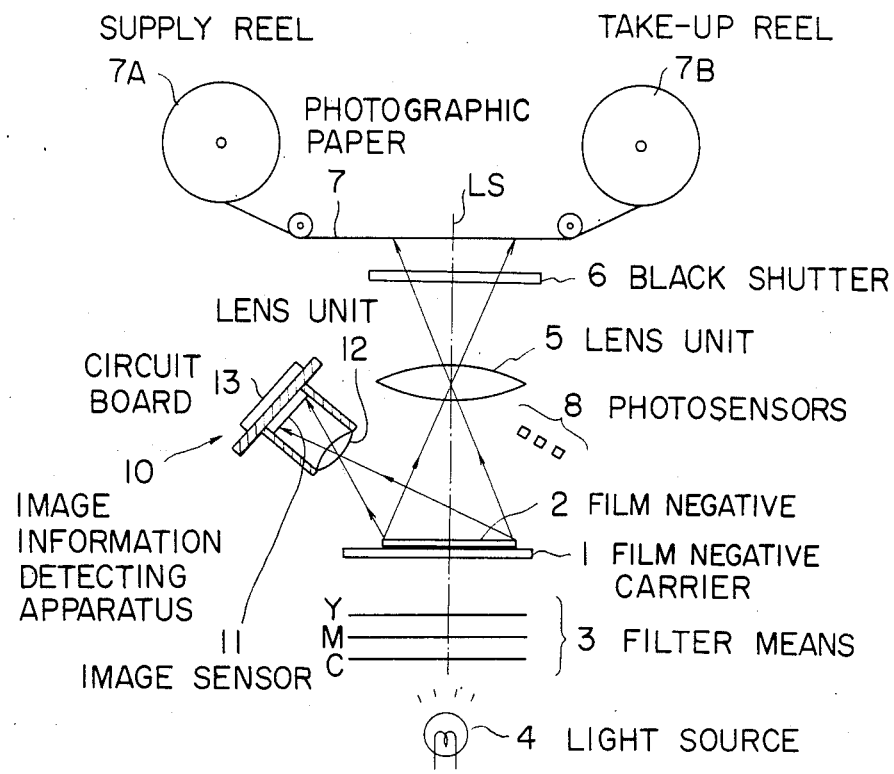
FIG. 1 is a schematic view of one example of a photographic printer to be used for carring out a photographic image information calibrating method according to this invention.
Figure 2:
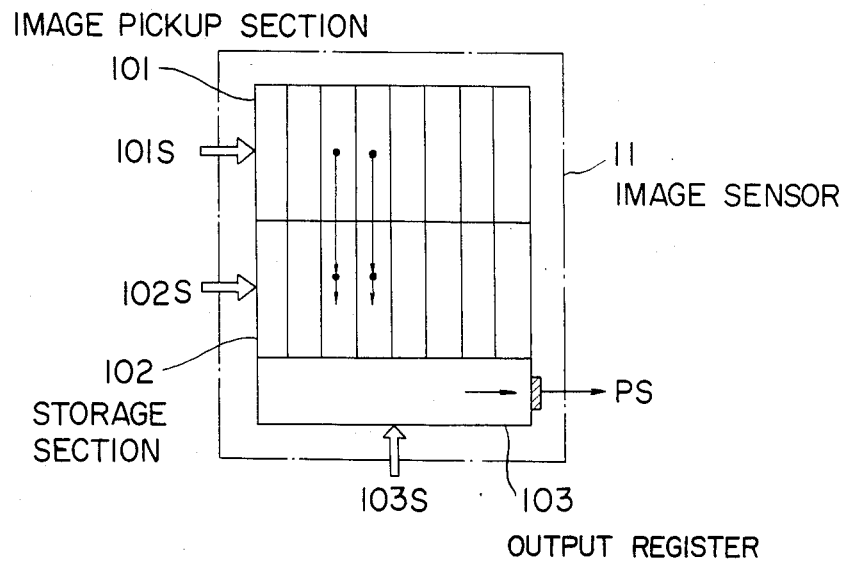
FIG. 2 shows a schematic constructional view for explaining the function of a two-dimensional image sensor of the apparatus shown in FIG. 1.
Figure 3:
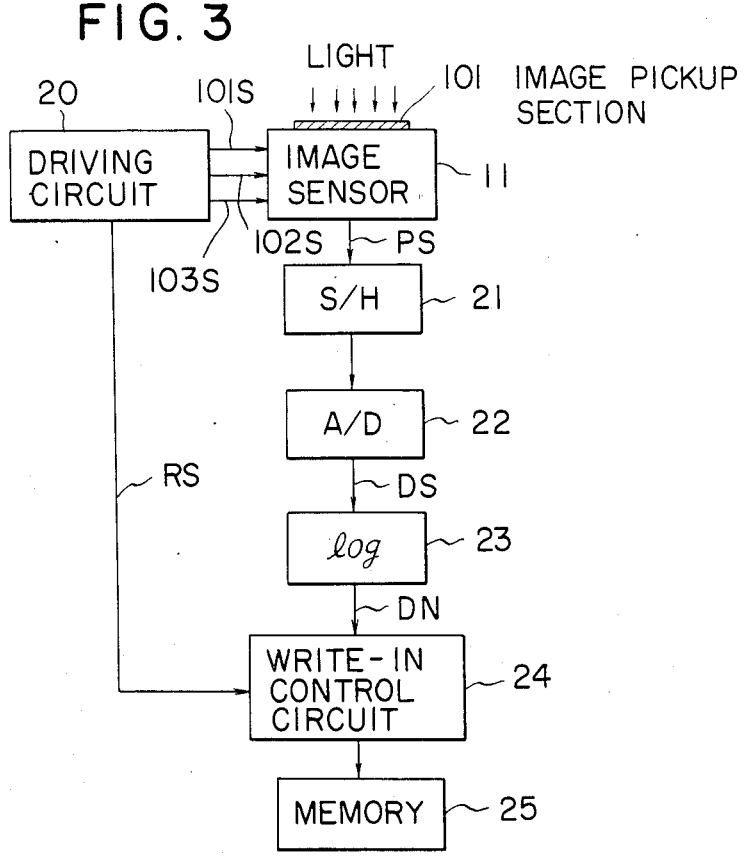
FIG. 3 shows a block diagram of a controlling system for the two-dimensional image sensor.
Figure 5:
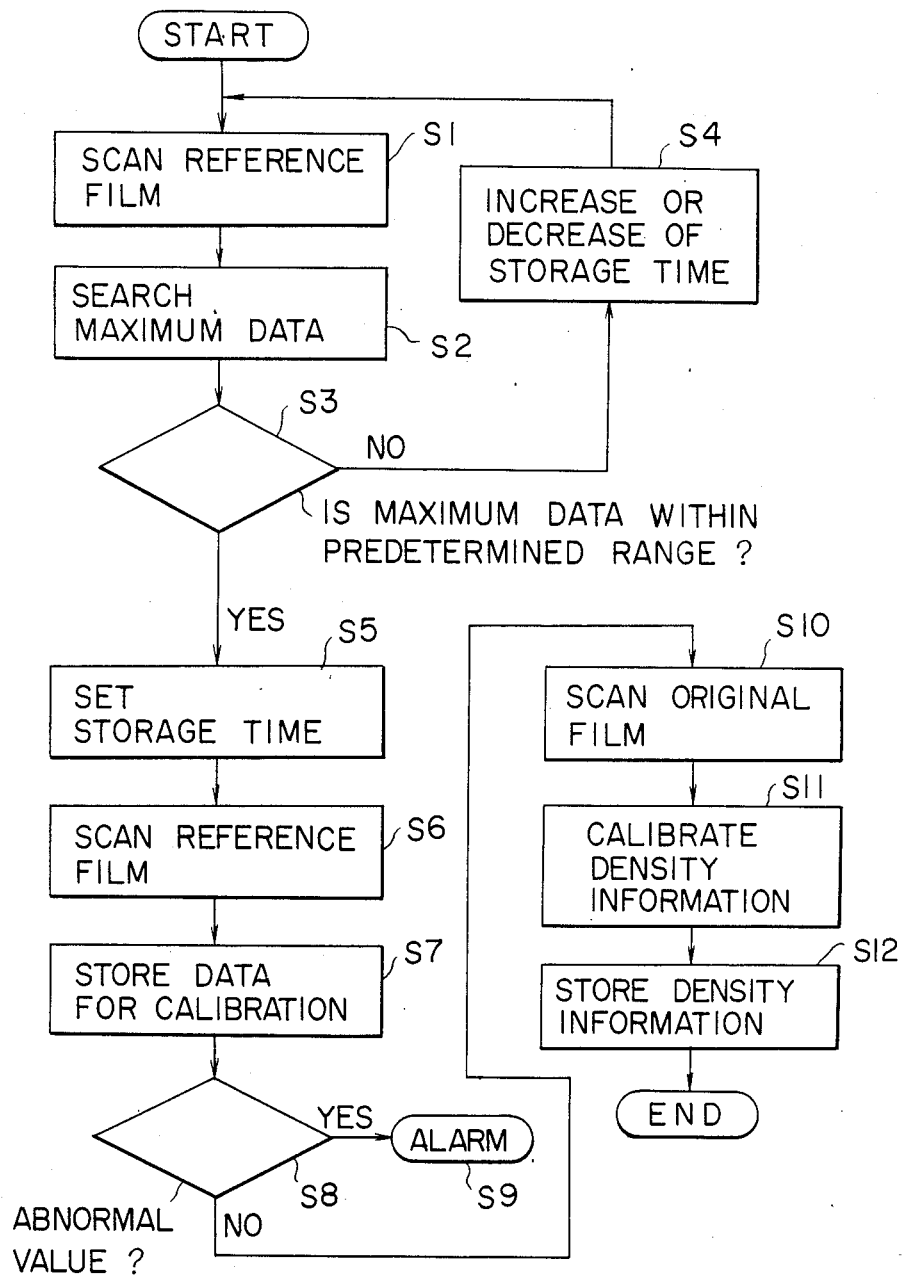
FIG. 5 shows a flow chart for carrying out the calibrating method of this invention.

Although the operation according to the method of this invention is performed in accordance with flow chart represented by FIG. 5, the photographic printer and mechanisms shown in FIGS. 1 through 3 are used as hardware therefor.

The operation will be described hereunder.

In the method of this invention, it is predetermined that the digital signals DS from the A/D converter 22 are directly inputted into the write-in control circuit 24 without being passed through the logarithmic conversion circuit 23. A reference film of the type which is identical to the maker of the photo-sensitive material, film size, a kind of film and the like of the film negative 2 is first provided at the printing portion. The reference film, for example, a portion having no image of the film negative 2, is transferred to the printing portion of the light axis LS, and the reference film is scanned for a predetermined storage time, for example the minimum time of the standardized time, based on the image sensor 11 (Step S1). The maximum data representing the most brilliant portion of the reference film is searched (Step S2). It is then determined whether or not the maximum data is within the predetermined range; that is, the lightness of the most brilliant portion of the reference film is within the predetermined range (Step S3), and when the maximum data is out of this range, the storage time is increased or decreased (Step S4). When the maximum data is smaller than the predetermined lower limit value, the stored time is elongated to increase the storaged amount, and on the other hand, when the maximum data is larger than the predetermined upper limit value, the stored time is shortened to decrease the storage amount. Accordingly, in either one of these cases, the storage elongation or shortening operation is repeated until the time that the maximum data is brought into the predetermined range. When the maximum data of the reference film is brought into the predetermined range, the storage time of the image sensor 11 is set (Step S5) and the scanning of the reference film is again carried out (Step S6). After the step S6, the digital signals DS from the A/D converter 22 are treated so as to be inputted into the logarithmic conversion circuit 23 as described in connection with FIG. 3. Since the reference film is then under the blanked condition in which no image is photographed, it is assumed that the image information of the reference film when it is scanned would become zero "0". However, as described hereinbefore, with the image detecting system, the image information represented by values other than zero "0" will be detected such as shown in FIG. 6A because of the unevenness of the elements of the image sensor 11, the shading of the light source 4, the aberration of the lens unit 12 or the like. The data regarding such image information is detected by the detecting system, and the data is stored in the memory 25 (Step S7) as data for calibration for the reason that the data is always included in the image information when the image is detected.

At the next step S8, it is determined whether or not an abnormal value regarding a certain picture element, for example, whether or not an abnormally large value in comparison with the data regarding the picture elements near the certain picture element is found in the data for calibration stored in the memory 25 as shown in FIG. 6A, and when such an abnormal valve is determined, an alarm is generated for information of the fact that dust, dirt or the like has adhered on the lens surface (Step S9).

Figure 4A:
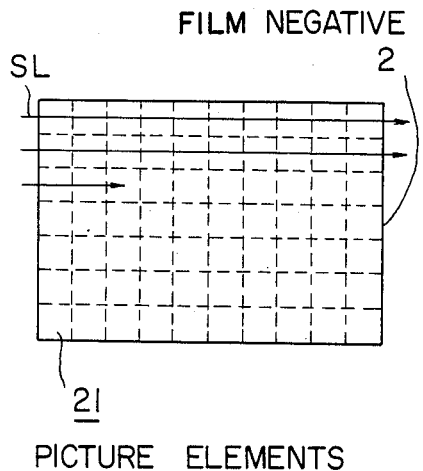
FIGS. 4A and 4B are views for showing correspondence between the divided picture elements of the original film and the stored data for the image informations.
Figure 4B:
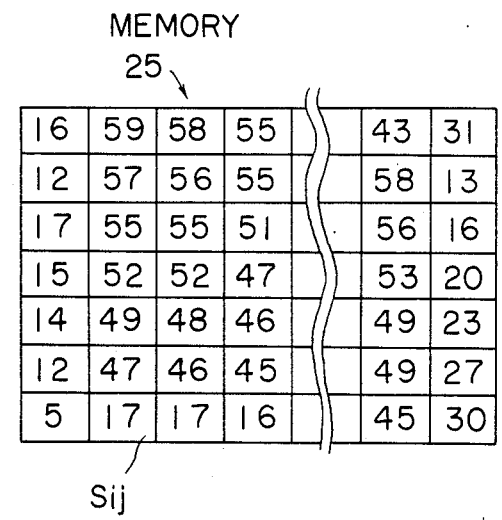

On the other hand, when no abnormal value is found in the data for calibration, the reference film is removed from the optical system and the film negative 2 whose image of which is to be detected is transferred by the film negative carrier 1 into the optical system thereby to carry out the scanning operation for detecting the image by the image sensor 11 as described before (Step S10). In this case, it is presumed that the image information would be represented as shown in FIG. 4B, so that the information regarding the density of the image can be calibrated by subtracting the data for calibration beforehand obtained (Step S11) and the thus calibrated data regarding the density as shown in FIG. 6B is stored as the available image information (Step S12). In other words, since the respective image density information in FIG. 4B correspond to the data for calibration in FIG. 6A with respect to the respective picture elements, the calibration is performed by subtracting the calibration data of the picture element Sij in FIG. 6A from the density data of the picture elements Sij in FIG. 4B and the thus calibrated values are stored in the other areas of the memory 25 as correctly aligned available image information as shown in FIG. 6B. According to this calibration method, the image information provided with no unevenness or scattering of the detecting system can be obtained. Such image information calibration as referred to above will be performed with respect to three primary colors of R, G and B which can be optionally selected in accordance with the mode of usage of the image information.

In the foregoing description, although is disclosed a method in which the image information of the original film is calibrated during the read-out operation thereof by the calibration data preliminarily obtained and stored, the read-out image information would be calibrated after once being stored in the memory. In addition, the number of elements of the image sensor can be optionally selected and the necessary number of elements can be optionally decided on the basis of the size of the original film to be used, and the magnification of the lens system and the number of picture elements to be required. Moreover, the image sensor is not limited to a charge coupled device and a device which can divide the image into a plurality of elements and detect the same can be utilized.

Consequently, according to this invention, since the unevenness or scattering, which is likely observed in a detecting system, of the image information of the picture elements is preliminarily obtained and stored, and the actual image information of an original film can be accurately obtained by the data preliminarily obtained for calibration.

It should be understood that many modifications and adaptations of the invention will become apparent to those skilled in the art and it is intended to encompass such obvious modifications and changes in the scope of the claims appended hereto.

What is claimed is:

1. A method for calibrating information regarding a photographic image in an image information detecting method of the type in which light transmitted from an original film is received by an image sensor, and image information of the original film over an entire area from which said image sensor receives light is detected from respective picture elements which are divided into a plurality of segments, the image information comprising a plurality of pieces of data, the pieces of data corresponding to the plurality of segments of the picture elements; the method comprising the steps of: detecting image information of a reference film in place of the original film using the image sensor, the image information comprising a plurality of pieces of data, the pieces of data corresponding to the plurality of segments of the picture elements; storing the detecting image information of the reference film as data for calibration; comparing the pieces of image data of the original film detected by said image sensor with the corresponding pieces of data for calibration; and subtracting the pieces of data for calibration from the corresponding pieces of image data of the original film so as to thereby accurately obtain calibrated image information.

2. A method according to claim 1, wherein the image data of the original film and the data for calibration of the reference film are respectively represented by digital density values, and wherein when a density value of a certain picture element of the data for calibration has a digital value which is different by a predetermined amount from digital values of the density data of other picture elements located around the certain picture element, then an alarm signal is generated so as to indicate the fact that such a different digital value exists.

* * * * *